(No Model.)
D. F. & J. A. COLLINGWOOD.
DEVICE FOR WATERING HOGS AND OTHER ANIMALS.
No. 377,016. Patented Jan. 31, 1888.
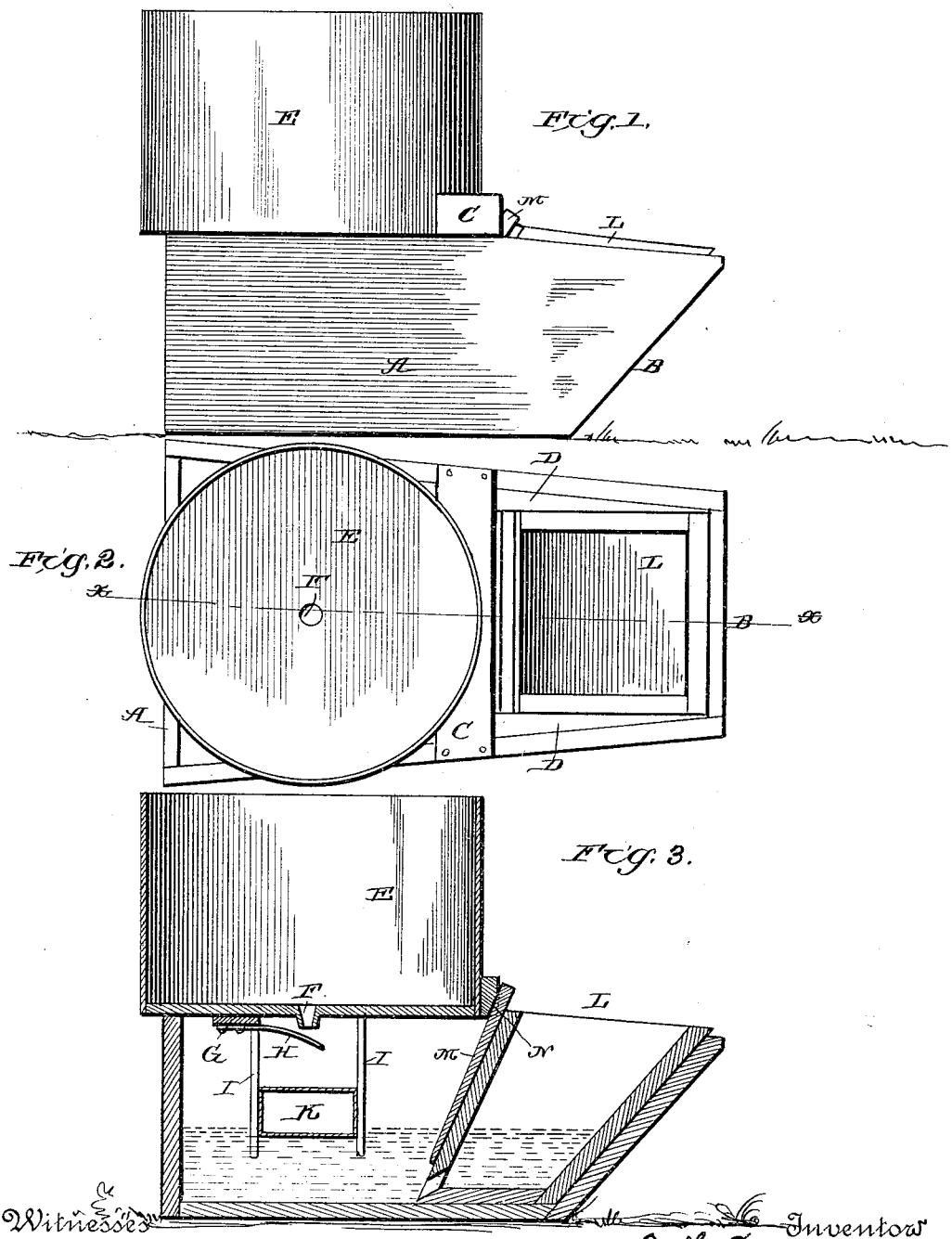

UNITED STATES PATENT OFFICE.

DANIEL FRANKLIN COLLINGWOOD AND JAMES ALBERT COLLINGWOOD, OF PRETTY PRAIRIE, KANSAS.

DEVICE FOR WATERING HOGS AND OTHER ANIMALS.

SPECIFICATION forming part of Letters Patent No. 377,016, dated January 31, 1888.

Application filed June 9, 1887. Serial No. 240,791. (No model.)

*To all whom it may concern:*

Be it known that we, DANIEL FRANKLIN COLLINGWOOD and JAMES ALBERT COLLINGWOOD, citizens of the United States, residing at Pretty Prairie, in the county of Reno and State of Kansas, have invented a new and useful Improvement in Devices for Watering Hogs and other Animals, of which the following is a specification.

Our invention relates to an improvement in devices for watering hogs and other animals; and it consists in the peculiar construction and combination of devices, that will be more fully set forth hereinafter, and particularly pointed out in the claim.

In the drawings, Figure 1 is a side elevation of a watering device embodying our improvements. Fig. 2 is a top plan view of the same. Fig. 3 is a vertical longitudinal sectional view taken on the line $x$ $x$ of Fig. 2.

A represents a trough, which is preferably made in the form of a slide, and has its front end inclined upward, as at B. On the upper side of the trough, at a suitable distance from the front end thereof, is a cross-bar, C.

D represents wedge-shaped cleat-bars, which are secured to the opposing inner sides of the front portion of the trough.

E represents a cylindrical tank which is supported on the upper edges of the side and rear ends of the trough A. In the bottom of the said tank is a depending pipe or nozzle, F.

G represents a block, which is secured on the bottom of the tank at a slight distance to one side of the pipe or nozzle F, and to the under side of the said block is secured the inner end of a flexible valve, H, the outer end of which is arranged under and is adapted to close the lower end of the nozzle or spout F.

I represents a series of four vertical guide-rods, which extend downward from the bottom of the tank into the trough A and reach nearly to the bottom thereof.

K represents a float which is arranged between the guide-rods I, and is adapted to move vertically between the said guide-rods.

L represents a fountain, which fits in the inclined front end of the trough A and rests between the wedge-shaped cleats D. In the bottom of the fountain are openings which communicate with the interior of the trough.

M represents a wedge-shaped key, which is adapted to fit in a recess, N, made in the lower front side of the cross-bar C. The said wedge-shaped key bears firmly against the rear side of the drinking-fountain, and thus secures the latter in position in the front end of the trough, so that it cannot be removed therefrom by the animals.

The operation of our invention is as follows: The water which is placed in the tank E flows therefrom through the spout or nozzle F into the trough, and as the water rises in the trough it also rises in the drinking-fountain, as will be readily understood. When the trough and drinking-fountain are filled to the required level, the float K rises and bears against the under side of the valve H and closes the latter against the lower end of the spout or nozzle F, thereby cutting off the flow of water from the tank to the trough. When the level of the water in the trough becomes lowered as the water is consumed, the float lowers and causes the valve to again open the discharge-spout, and thus a flow of water from the tank to the trough ensues until the water again reaches the required level in the trough.

This improved watering device is particularly adapted for watering hogs, but may be used for watering other kinds of stock.

In practice we propose to place a screen over the nozzle or opening in the bottom of the reservoir to prevent it from becoming stopped up.

It is obvious that modifications may be made in the device, such as providing a drinking-fountain at each end of the trough, and thereby adapt the device to water animals in two adjacent pens.

Having thus described our invention, we claim—

The combination, with the trough having its front end inclined upward and outward, the cross-bar C a suitable distance in rear of the front edge of said trough, the removable tank E, resting on the rear portion of said trough and provided with a tubular discharge-opening, F, in its bottom, and the flexible valve H, secured to the bottom of the tank and adapted to close said opening, of the four guide-bars I, depending from the bottom of the tank, the float K, held between said guide-bars, but free to rise and fall with the water in the trough, the removable trough L, made fitting in the inclined front end of the trough A and provided with an opening in its rear side adjoining its bottom, and the wedge-shaped piece M, by means of which the trough L is held in place in front of the bar C, substantially as specified.

In testimony that we claim the foregoing as our own we have hereto affixed our signatures in presence of two witnesses.

DANIEL FRANKLIN COLLINGWOOD.
  JAMES ALBERT COLLINGWOOD.

Witnesses:
 J. D. SMITH,
 JOHN L. SMITH.